July 5, 1966 V. L. DANN 3,259,348
EYEGLASSES HOLDER
Filed May 12, 1965
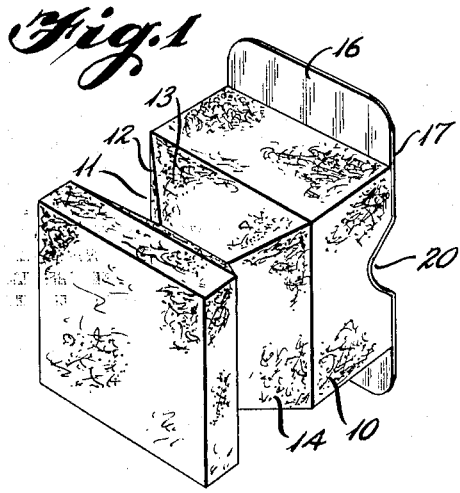
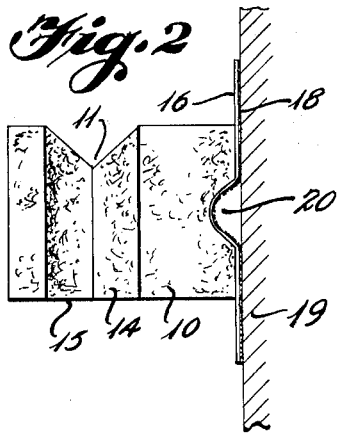
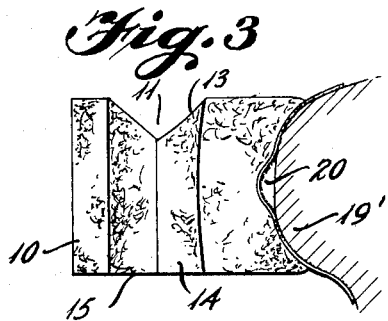
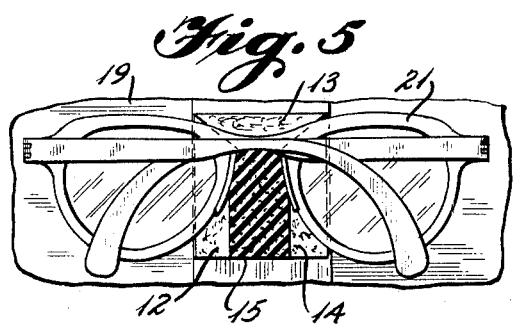
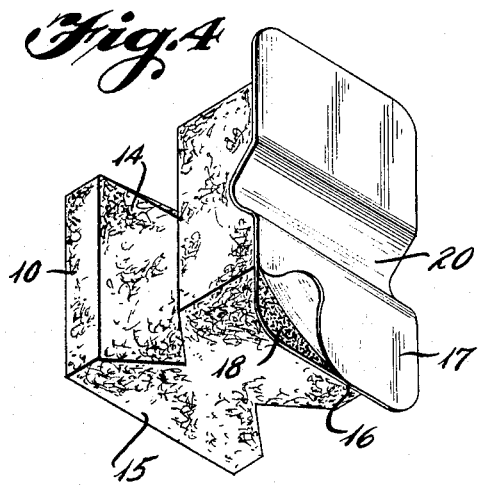
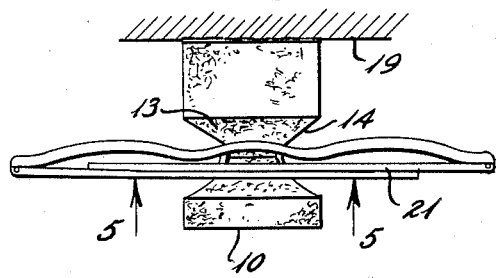
INVENTOR
VIRGIL L. DANN
BY
ATTORNEYS

United States Patent Office 3,259,348
Patented July 5, 1966

3,259,348
EYEGLASSES HOLDER
Virgil L. Dann, 802 Beach Trail, P.O. Box 292,
Indian Rocks Beach, Fla.
Filed May 12, 1965, Ser. No. 455,242
3 Claims. (Cl. 248—205)

This invention relates to fixed supports of a type capable of receiving and retaining an object in a fixed position when the object is not in use.

The invention relates particularly to a holder for eyeglasses or the like which can be attached to any convenient surface such as an automobile dashboard or other wall surface.

With the advent of sunglasses ground to individual prescriptions, it has become increasingly popular to own two or more pairs of eyeglasses—one clear and the other tinted. This concept has become especially popular with the operators of automobiles, boats, airplanes, and the like, who utilize one pair or the other depending upon light conditions. In the past, sunglasses used by vehicle operators have been stored in such places as glove compartments, behind sun visors, in dashboard receptacles, and the like. One of the inherent problems with these storage places has been the fact that the lenses were directly exposed to the receptacle surfaces and therefore prone to scratches and abrasions incurred by vibrations resulting from the vehicle's motion. This not only has resulted in impaired vision but also caused annoying side effects such as headaches.

It is an object of the invention to provide a simple inexpensive holder or support for eyeglasses, which can be readily attached to any of a variety of surfaces and configurations, which will readily hold eyeglasses in a manner that they will not be easily marred or scratched, as well as a holder or support which can be manufactured and sold at a low cost.

Other objects and advantages of the invention will be apparent from the following description considered in conjunction with the accompanying drawing wherein:

FIG. 1 is a perspective illustrating one application of the invention;

FIG. 2, a side elevation revealing the manner of attachment to a supporting surface;

FIG. 3, a similar view illustrating application to a surface of a different configuration;

FIG. 4, a perspective viewed from the lower front;

FIG. 5, a vertical section on the line 5—5 of FIG. 6; and

FIG. 6, a top plan view illustrating the manner of holding or supporting a pair of eyeglasses.

Briefly stated, the invention is a holder or support having a portion somewhat the size of the nose of a person to receive eyeglasses or the like thereon and with an adhesive or other convenient attaching means by which it can be attached to any convenient surface such as for example but not limited to the dashboard of a motor vehicle such as an automobile. The invention may be of a unitary construction and made of any convenient material, preferably plastic, rubber, Styrofoam, or other readily deformable substance, and is provided with securing means such as a pressure sensitive adhesive, magnets, suction cups or the like.

With continued reference to the drawing, the invention comprises a holder or support 10 of blocklike character and of yieldable material such as Styrofoam, rubber, or the like, for retaining eyeglasses or other object with at least part of its surface area forming a notch or recess 11 having three pairs of downwardly and inwardly converging opposing or facing walls 12, 13 and 14 and a bottom 15 which may be flat or of other desired configuration.

As illustrated, the rear of the holder or support is provided with attaching means as for example an overlapping pressure sensitive adhesive backing 16. Upon installation of the device, a protective cover 17 for the adhesive backing 16 (shown in FIG. 4) is peeled off and discarded exposing adhesive layer 18. The device is then pressed into engagement with any convenient surface such as wall 19 or automobile dashboard 19' (FIG. 3).

In order to facilitate application to a variety of surfaces, the rear portion of the support is provided with a transverse notch or groove 20 which aids any desired deformation of the rear portion to accommodate various surfaces as illustrated in FIG. 3.

In the operation of the device as shown in FIGS. 5 and 6, a pair of eyeglasses 21, its temples crossed, is placed within the detent 11 with the nose pieces resting in the valley created by the converging walls 12, 13 and 14 and with the bridge resting on one of the top walls 13.

As previously mentioned, it is desirable, though not necessary, that the support be made of a deformable material such as rubber, Styrofoam, or the like in order to receive various nose piece widths in frictional engagement. As will be readily apparent from FIG. 6, the lenses do not come in contact with any surface at any time, thereby eliminating the possibility of scratches or abrasions thereon.

It will be apparent from the foregoing that a relatively simple easily obtainable readily applicable eyeglasses holder is provided of small cost which can be readily applied to a surface in almost any location, including the instrument panel of an automobile, where it can be used to hold eyeglasses conveniently for use at any time desired.

It will be obvious to one skilled in the art that various changes may be made in the invention without departing from the spirit and scope thereof and therefore the invention is not limited by that which is illustrated in the drawing and described in the specificaiton, but only as indicated in the accompanying claims.

What is claimed is:

1. A holder or support of blocklike configuration for retaining a pair of eyeglasses in a fixed storage position comprising an eyeglasses frame receiving body having three pairs of opposing downwardly and inwardly converging walls defining a receiving recess, a transverse groove at the rear portion of said support, means for detachably mounting and retaining said support in a substantially horizontal position when said support is attached to a substantially vertical surface, said support being of a deformable material so that a pair of eyeglasses may be retained in frictional engagement with said support without the lenses coming in contact with any surface.

2. A support for retaining eyeglasses in a fixed storage position comprising a blocklike body, a detent on three sides of said body, a transverse groove at the rear of said body and means for retaining said body on said support.

3. The structure of claim 2 in which the body is of a readily deformable material.

References Cited by the Examiner

UNITED STATES PATENTS

| | | | |
|---|---|---|---|
| 2,049,684 | 8/1936 | Bongiovanni et al. | 248—300 |
| 2,702,683 | 2/1955 | Green et al. | 248—309 |
| 2,765,998 | 10/1956 | Engert | 248—29 |
| 2,884,220 | 4/1959 | Manley | 248—309 |
| 2,956,687 | 10/1960 | Robichaud | 211—74 |
| 2,958,495 | 11/1960 | Foster | 248—176 |
| 2,991,967 | 7/1961 | Bothas | 211—13 |

CLAUDE A. LE ROY, *Primary Examiner.*